United States Patent
Ikemori

[11] 4,206,973
[45] Jun. 10, 1980

[54] RETROFOCUS TYPE WIDE-ANGLE OBJECTIVE

[75] Inventor: Keiji Ikemori, Yokohama, Japan

[73] Assignee: Canon Kabushiki Kaisha, Tokyo, Japan

[21] Appl. No.: 931,255

[22] Filed: Aug. 4, 1978

[30] Foreign Application Priority Data

Aug. 11, 1977 [JP] Japan .................................. 52-96442

[51] Int. Cl.² .............................................. G02B 9/64
[52] U.S. Cl. ...................................... 350/214; 350/207
[58] Field of Search ................ 350/214, 207, 176, 255

[56] References Cited

U.S. PATENT DOCUMENTS

| 3,877,795 | 4/1975 | Yamashita | 350/214 |
| 4,025,170 | 5/1977 | Kamamura | 350/214 |

*Primary Examiner*—Paul A. Sacher
*Attorney, Agent, or Firm*—Toren, McGeady and Stanger

[57] ABSTRACT

A retrofocus wide angle objective having an angle of view of at least 82° with a relative aperture of 1:2.8 and whose back focal distance is made longer than 1.4 times the focal length of the entire system. The objective comprises, from front to rear, a first lens of positive power in a forwardly convex meniscus form, a second negative meniscus lens, a third positive lens, a fourth negative lens, a fifth biconvex lens, a diaphragm, a sixth biconvex lens, a seventh biconcave lens, and eighth and ninth positive lenses. In such retrofocus objective with the positive meniscus lens arranged at the front, while the angle of view is maintained increased, the lens system is reduced in dimensions and is properly corrected in particular for distortion and astigmatism.

3 Claims, 24 Drawing Figures

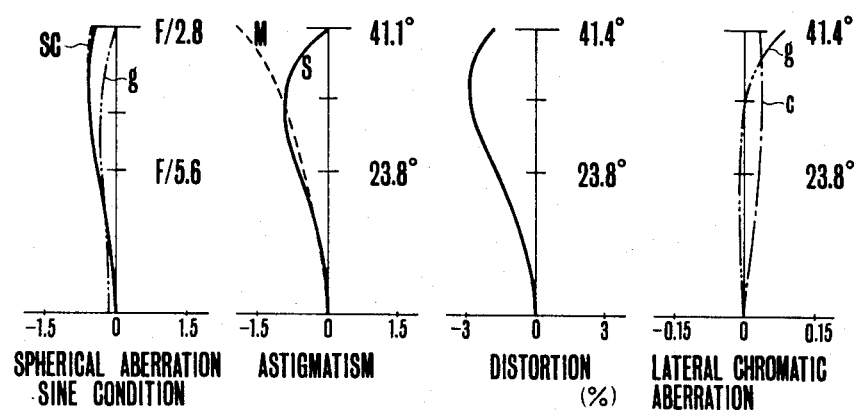
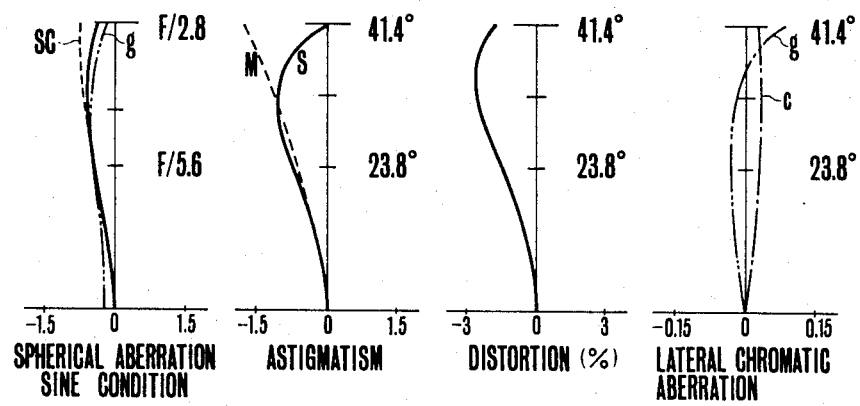

RETROFOCUS TYPE WIDE-ANGLE OBJECTIVE

BACKGROUND OF THE INVENTION

This invention relates to retrofocus type photographic objectives, and more particularly to a compact retrofocus objective having a wide angular field coverage and a longer back focal distance than 1.4 times the focal length thereof.

Recent developments in interchangeable objectives for use in 35 m/m single lens reflex cameras are directed to compact designs, and this tendency is especially pronounced in the wide angle lens art. Because it allows a sufficiently long back focal distance, the retrofocus type has been widely accepted in designing such wide angle objectives. The employment of the retrofocus type, however, gives rise to many difficult problems of aberrational correction because of the asymmetrical lens arrangement.

Of the various aberrations, the distortion which is introduced by the divergent front lens group constitutes a most important subject for correction. According to the generally accepted proposal, a positive component is arranged in the front group of the lens system. With such construction and arrangement of the front lens group, however, the off-axial rays of light are strongly refracted by that positive component. Hence the other aberrations tend to be increased and the diameter of the front member must be increased to secure the equivalent angular field coverage.

As the dimensions of this type wide angle objective are reduced, therefore, these problems are made more difficult to solve, resulting in a less standard of correction of the aberrations. A high standard of aberrational correction has so far been realized by employing especial optical glasses in making the various lens elements. This leads to an increase in the production cost of objectives.

Attempts have been made to provide a compact retrofocus wide angle objective which has overcome the above mentioned drawbacks and which is well corrected for the various aberrations as in U.S. patent application Ser. No. 892,422 (Filed Mar. 31, 1978) assigned to the assignee of the present invention. Of the examples of the lens systems described therein, the fourth example nears the construction of the lens of the present invention. The lens in this example has an angle of view of 75°, and f-number of 1:2.0. The present invention provides a retrofocus type lens having a larger angle of view than that of the above mentioned cited example, while nevertheless maintaining the length of the entire lens system at minimum, and achieving good correction of the aberrations.

SUMMARY OF THE INVENTION

An object of the present invention is to provide a retrofocus type lens of reduced size and a large angle of view.

A second object of the present invention is to provide a retrofocus type lens having a back focal distance equal to or longer than 1.4 times the focal length thereof.

A third object of the present invention is to provide a retrofocus type lens which is well corrected for the various aberrations particularly distortion and astigmatism or lateral chromatic aberration simultaneously.

It is also an object of the present invention to prevent the image quality to be decreased when focusing is performed to suit for nearer objects.

BRIEF DESCRIPTION OF THE DRAWINGS

FIGS. 4A to 4D are graphic representations of the spherical aberration, astigmatism, distortion and lateral chromatic aberration of the lens of FIG. 1 with object at infinity.

FIGS. 5A to 5D and 6A to 6D are similar representations of the lenses of FIGS. 2 and 3 respectively.

DETAILED DESCRIPTION OF THE PREFERRED EMBODIMENT

Figure 1:
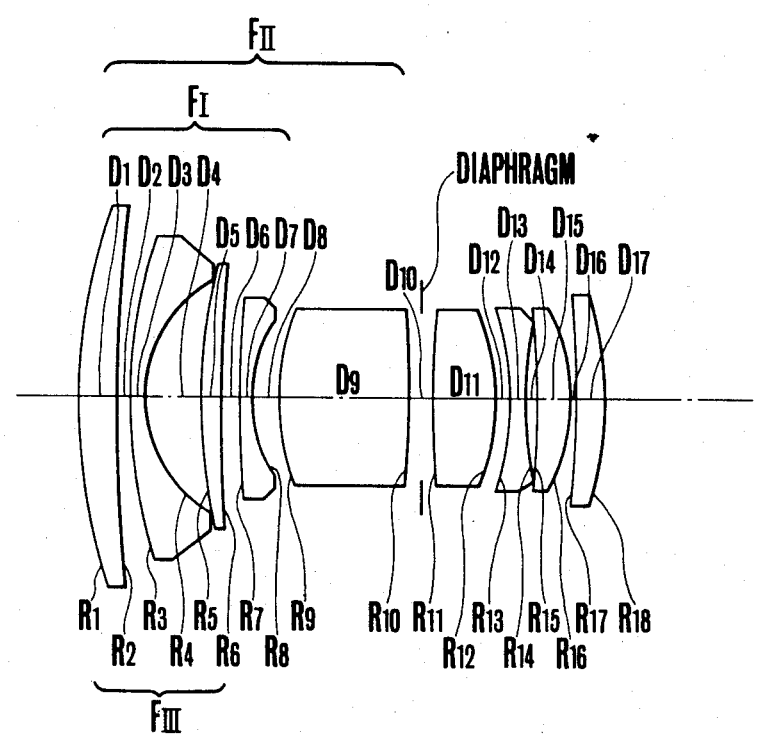
FIG. 1 is a diagram of a first example of a specific compact retrofocus wide angle objective according to the present invention.
Figure 2:
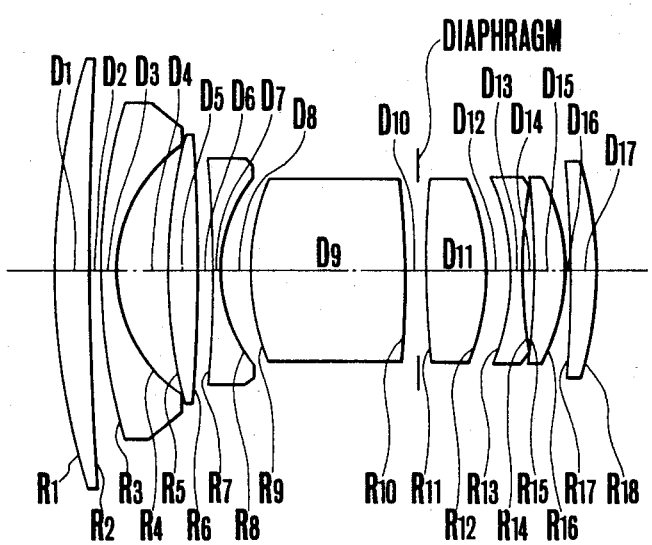
FIG. 2 is a diagram showing a second example of the present invention.
Figure 3:
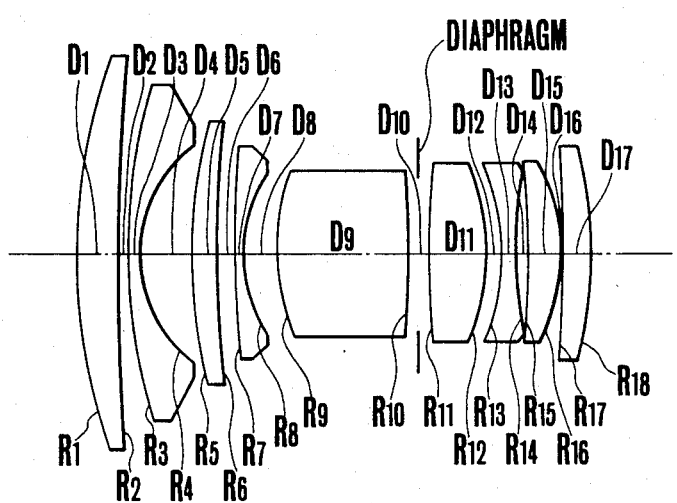
FIG. 3 is a diagram showing a third example of the present invention.
Figures 6A, 6B, 6C, 6D:
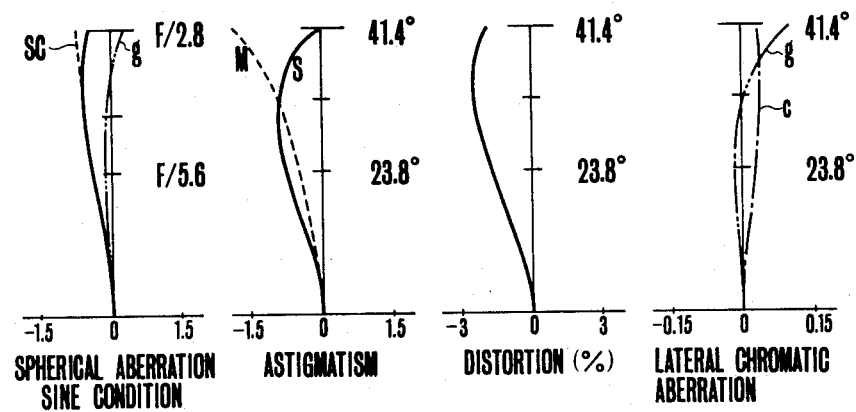
Figures 7A, 7B, 7C:
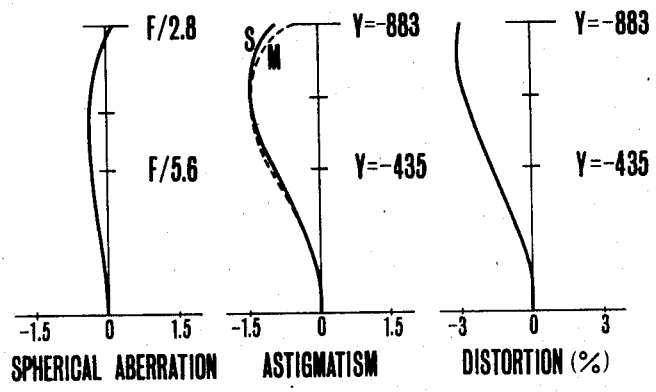
FIGS. 7A to 7C, 8A to 8C and 9A to 9C are graphic representations of the spherical aberration, astigmatism and distortion of the lenses of FIGS. 1 to 3 respectively when focused at an object distance corresponding to a magnification of 1/10.
Figures 8A, 8B, 8C:
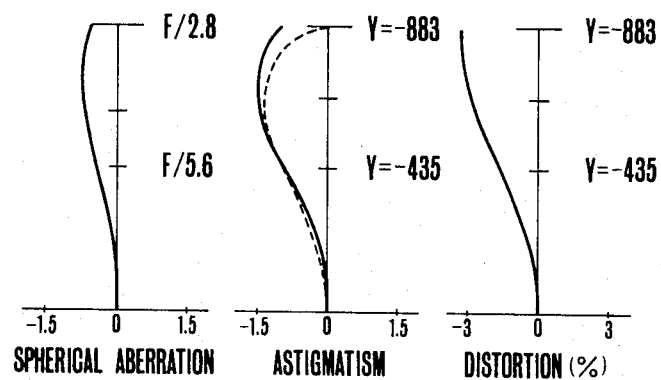
Figures 9A, 9B, 9C:
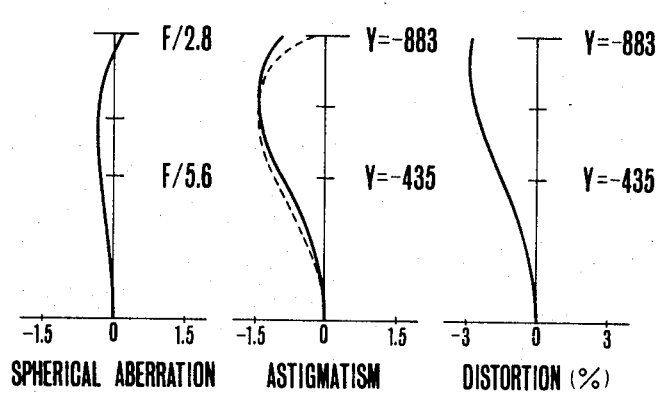

In FIGS. 1 to 3 the lenses are identified by their dimensions $D_x$. FIGS. 1 to 3, show an embodiment of a compact retrofocus wide angle objective according to the present invention including, from front to rear, a first lens $D_1$ of positive power in a forwardly convex meniscus form, a second negative meniscus lens $D_3$ of rearward concavity, a third positive lens $D_5$ and a fourth negative lens $D_7$, the image side curvature (radius $R_6$) of the third lens and the object side curvature (radius $R_8$) of the fourth lens being of the same sign and the combined refractive power of these four lenses being negative. The objective further includes a fifth biconvex lens $D_9$ having a strong front curvature $R_9$, that is, a smaller absolute value of the radius of curvature of the front surface than that of the radius $R_{10}$ of curvature of the rear surface, a diaphragm, a sixth biconvex lens $D_{11}$ having a strong rear curvature (radius $R_{12}$), a seventh biconcave lens $D_{13}$ having a strong front curvature (radius $R_{13}$), and eighth and ninth positive lenses $D_{15}$ and $D_{17}$. In the preferred embodiment of the present invention, the front surface of the third positive lens is convex toward the front, the rear surface of the fourth negative lens is concave toward the rear, and the eighth and ninth lenses are positive meniscus lenses of forward concavity. By employing the arrangement of the positive, negative, positive and negative lenses in this order from the front in combination with the above defined lens configurations, it is made possible to achieve simultaneous good correction of distortion and astigmatism which was considered in the prior art to be difficult to perform in good balance. Further, the location of the diaphragm in a space between the central or fifth lens $D_9$ and the sixth lens $D_{11}$ is advantageously utilized to achieve the compactness of the lens system.

The objective of the present invention is characterized by fulfilling the following relationships:

$$0.5F \leq |F_I| \leq 0.75F, \ F_I < 0 \qquad (1)$$
$$2.5F \leq |F_{II}| \leq 4.5F, \ F_{II} < 0 \qquad (2)$$
$$0.29 \leq (D9 + D11)/L \leq 0.42 \qquad (3)$$
$$\left| \frac{1}{R12} - \frac{1}{R13} \right| \leq \frac{0.13}{F} \qquad (4)$$

-continued $$0.02F \leq D12 \leq 0.1F \quad (5)$$
$$48 \leq (\nu1, \nu4, \nu6) \leq 63 \quad (6)$$
$$30 \leq (\nu2, \nu3) \leq 41; 26 \leq \nu5 \leq 32 \quad (7)$$

wherein F is the focal length of the entire system; $F_I$ is the composite focal length of the first four lenses; $F_{II}$ is the composite focal length of the first five lenses; L is the total length of the lens system measured from the front surface of the first lens to the rear surface of the ninth lens; D9 is the axial thickness of the fifth lens; D11 is the axial thickness of the sixth lens; R12 is the radius of curvature of the rear surface of the sixth lens; R13 is the radius of curvature of the front surface of the seventh lens; D12 is the axial air separation between the sixth and seventh lenses; and $\nu1$, $\nu2$, $\nu3$, $\nu4$, $\nu5$ and $\nu6$ are the Abbe numbers of the first, second, third, fourth, fifth and sixth lenses respectively.

The fulfillment of the inequality (1) insures that a sufficiently long back focal length for adaptation to a single lens reflex camera is provided while the diameter of the front member of the lens system is maintained at minimum. In comparison with the conventional objective described in the aforesaid U.S. patent application Ser. No. 892,422, the absolute value of the composite focal length of the first four lenses is defined as shifted toward smaller values. This is because the objective of the present invention is provided with a larger angular field coverage of at least 82° than that of the conventional one, namely, 75°, and in order to provide such a large angular field coverage, it is necessary to increase the divergence of the first four lenses. But it is to be noted here that as $|F_I|$ is decreased, there is a higher possibility of producing higher order spherical aberration. On this account, according to the present invention, the F-number of the objective is increased from the cited reference so as to afford optimum aberrational correction. Moreover, the good correction of the aberrations for the marginal rays (rays at the large angle with optical axis), is facilitated by making use of a forwardly concave positive meniscus lens as a ninth component, since this lens form has no rapid refracting effect on the marginal rays. When the upper limit of the inequality (1) is exceeded, it is difficult to provide a sufficient back focal distance and to maintain the diameter of the front member at a minimum. When the lower limit is exceeded, extremely large higher order spherical aberration is produced. In the specific lens systems to be described later, the back focal length is made longer than 1.4 times the focal length.

The relationship (2) represents the focal length of a front lens group of all lens elements on the object side of the diaphragm. This focal length is required to be negative for the compactness of the lens system. As the angle of inclination of an oblique ray passing through an opening of the diaphragm aperture with the optical axis is smaller than that of incidence of that ray on the first surface of the lens system, the height of incidence of the most marginal ray (at the maximum angle with optical axis) on the first surface may correspondingly be decreased. Therefore, the diameter of the first member can be reduced along with those of the other four members in the front group. When the upper limit is exceeded, though the diameter of the front member may be decreased, the diameters of the following members must be increased to so large extent that the good correction of the aberrations particularly spherical aberration and coma is difficult to perform. Conversely when the lower limit is exceeded, the desired degree of compactness can not be assured so that the diameter of the front member and the physical length of the objective are simultaneously increased.

The relationship (3) represents a good compromise between the physical length of the objective and the diameter of the front member while still permitting distortion and astigmatism to be highly corrected. When the upper limit is exceeded, though the diameter of the front member may be reduced, the physical length of the objective becomes very long with increase in battel type distortion. When the lower limit is exceeded, the diameter of the front member is extremely increased with increase in higher order aberrations for the off-axial rays, and it becomes difficult to achieve simultaneous good correction of distortion and astigmatism.

The relationships (4) and (5) represent the form of an air lens between the sixth and seventh lenses which introduces higher-order aberrations into the system so that the spherical aberration and lateral aberration in the sagittal plane for the marginal rays at the full open aperture can be well compensated for. In other words, since the surfaces R12 and R13 are configured in almost concentric relation to the diaphragm, the meridional ray in the marginal zone is little susceptible to refraction, while the axial ray and the sagittal ray in the marginal zone are largely affected to compensate for the spherical aberration in an under-corrected sense at increasing rates as the size of diaphragm aperture is increased, and for the lateral aberration for the marginal rays in the sagittal plane in an under-corrected sense. When the values of (1/R12−1/R13) and D12 are smaller than −0.13/F and 0.02F, respectively, the air lens hardly produces higher-order aberrations which compensate for the spherical aberration and for the lateral aberration for the marginal rays in the sagittal plane at the full open aperture toward moderate under-correction thereof. When the values of (1/R12−1/R13) and D12 are larger than 0.13/F and 0.1F respectively, secondary and tertiary spherical aberrations are largely produced to result in extremely large under-correction of spherical aberration from the neighborhood of the optical axis. In addition thereto, the back focal distance becomes too short to cause mechanical interference between the objective lens and a tiltable mirror of the camera associated therewith.

The relationships (6) and (7) are the conditions for very good correction of lateral chromatic aberration, longitudinal chromatic aberration and chromatic spherical aberration. In other words, the first and second members are made up of glasses having Abbe numbers adjusted so as to contribute to under-corrected lateral chromatic aberrations with magnitudes as equal to each other as possible for the rays of inclination angles ranging from an intermediate angular field coverage to the maximum possible coverage at a short wave length, for example, that of g-line, while the third to sixth members are made up of glasses having Abbe numbers adjusted to contribute to over-corrected lateral chromatic aberrations (for g-line). As a result, the under-corrected residual of lateral chromatic aberration from the first and second members is cancelled out by the over-corrected one from the third to sixth members.

The fourth member is made up of a glass having an Abbe number adjusted so as to produce as small longitudinal chromatic aberration and chromatic spherical aberration as possible, and the residual of such aberrations introduced by the fourth member into the system is compensated for by adjusting the Abbe numbers of the third and fifth members.

Such selection of the glasses of the third, fourth and fifth members for adaptation to good simultaneous correction of lateral and longitudinal chromatic aberration and chromatic spherical aberration will lead to an occurrence of two different ideal values of Abbe number for each member. However these values do not deviate from each other so much as to be incapable of fulfilling the requirements (6) and (7), since a glass of low dispersion may be selected for employment in at least the positive first, negative fourth and positive lenses, and a glass of high dispersion in at least the negative second, positive third and positive fifth lenses. When the lower limit of the inequality (6) and the upper limit of the inequality (7) are simultaneously exceeded, it is no longer possible to achieve good correction of all lateral chromatic aberration, longitudinal chromatic aberration and chromatic spherical aberration. If the longitudinal chromatic aberration and chromatic spherical aberration are well corrected, the lateral chromatic aberration for g-line is under-corrected at the intermediate angles of view field, and is over-corrected at the largest angle. When the upper limit of (6) is exceeded, or when the lower limit of (7) is exceeded, the lateral chromatic aberration is well corrected, but instead the longitudinal chromatic aberration for g-line is extremely over-corrected, and the chromatic spherical aberration for g-line is extremely over-corrected in the neighborhood of the full open aperture. It is noted here that the glasses whose Abbe numbers fall in the ranges set forth in (6) and (7) are inexpensive and feasible for manufacturing techniques so that the production cost can be reduced.

In order to insure that the thus corrected aberrations are stabilized over the focusing range, it is desired to move the lens system as a whole toward the front as focusing is effected down to shorter object distances, while the axial air separation between the third and fourth members is decreased simultaneously and to fulfill the following requirements:

$$1.9F < |F_{III}| < 12F, \quad F_{III} < 0 \tag{8}$$

$$1 < H7 < 1.2 \tag{9}$$

where $R_{III}$ is the composite focal length of the first to third lenses, and H7 is the height of incidence on the front surface (R7) of the fourth lens of a paraxial ray which entered the system at an incident angle of zero (parallel to the optical axis) and at a height of 1 with object at infinity provided that the focal length of the entire system is 1.

As focusing is effected to suit shorter object distances, the forward axial movement of the lens system causes a tendency of producing extremely over-corrected astigmatism to appear. As is known in the art, such astigmatism can be compensated for by decreasing the axial air separation between the third and fourth members in synchronism with the forward axial movement of the entire lens system.

If such focusing provision is made without setting forth any condition, however, there will be a high possibility of deteriorating the other aberrations and particularly spherical aberration. The fulfillment of the requirements (8) and (9) insures that the astigmatism is maintained at a minimum without causing any large increase in the other aberrations.

With the first four lenses constituting a divergent group, as the diverging action of the fourth lens is prevented from becoming extremely strong, it is preferable to impart a negative power into the group of at least first three lenses. When the lower limit of (8) is exceeded, the spherical aberration becomes extremely over-corrected in close-up positions, and the astigmatism is varied considerably during focusing. Conversely when the upper limit is exceeded, the divergent refractive power of the fourth lens becomes too strong to increase the complexity of aberrational problem. Since the 3rd-order spherical aberration is proportional to the fourth power of incident height H, when H7 is larger than 1.2, extremely over-corrected spherical aberration is resulted in close up positions. When H7 is smaller than 1, the divergent refractive power of the fourth lens becomes too strong to unable the good correction of the aberrations by any simple method likewise as in the above.

Three examples of specific lens systems represented in FIGS. 1 to 3 can be constructed in accordance with the numerical data given in the following tables for the radii of curvature, R1 to R18, the axial thickness and air separations, D1 to D17, along with the indices of refraction, N1 to N9 and the Abbe numbers, $\nu1$ to $\nu9$ of the various lens elements. The minus values of the radii, R, indicate surfaces concave to the front. Each of the lens systems has a relative aperture of 1:2.8 and an angular field coverage of 82.9°.

EXAMPLE 1

| Focal length F = 100 | | | | Back Focal Distance bf = 151.5 | | | |
|---|---|---|---|---|---|---|---|
| R1 | 187.845 | D1 | 14.98 | N1 | 1.6031 | $\nu1$ | 60.7 |
| R2 | 771.918 | D2 | 0.61 | | | | |
| R3 | 166.237 | D3 | 5.31 | N2 | 1.62004 | $\nu2$ | 36.3 |
| R4 | 44.714 | D4 | 18.82 | | | | |
| R5 | 174.208 | D5 | 7.55 | N3 | 1.63636 | $\nu3$ | 35.4 |
| R6 | 583.384 | D6 | variable | | | | |
| R7 | 559.282 | D7 | 3.27 | N4 | 1.62299 | $\nu4$ | 58.2 |
| R8 | 50.794 | D8 | 10. | | | | |
| R9 | 89.876 | D9 | 44.33 | N5 | 1.7552 | $\nu5$ | 27.5 |
| R10 | −392.261 | D10 | 8.16 | | | | |
| R11 | 403.404 | D11 | 21.63 | N6 | 1.6935 | $\nu6$ | 53.2 |
| R12 | −76.404 | D12 | 5.06 | | | | |
| R13 | −83.343 | D13 | 4.73 | N7 | 1.80518 | $\nu7$ | 25.4 |
| R14 | 159.769 | D14 | 3.8 | | | | |
| R15 | −320.816 | D15 | 10.78 | N8 | 1.6968 | $\nu8$ | 55.5 |
| R16 | −69.380 | D16 | 0.61 | | | | |
| R17 | −47.604 | D17 | 8.65 | N9 | 1.6968 | $\nu9$ | 55.5 |
| R18 | −126.982 | | | | | | |

The values of the factors in the inequalities:-
$F_I = -0.591F$
$F_{II} = -3.098F$
$(D9 + D11)/L = 0.378$
$1/R12 - 1/R13 = -0.109/F$
$F_{III} = 2.308F$
$H7 = 1.123$

| Lens Separation During Focusing | |
|---|---|
| | D6 |
| Infinity | 6.12 |
| Magnification 1/10 | 2.5 |

3rd-order Aberration Coefficients

| Surface No. | L | T | SA | CM | AS | PT | DS |
|---|---|---|---|---|---|---|---|
| 1 | 0.004078 | 0.005058 | 0.035406 | 0.043911 | 0.054460 | 0.200278 | 0.315936 |
| 2 | 0.000889 | −0.008142 | 0.001670 | −0.015301 | 0.140165 | −0.048737 | −0.837497 |
| 3 | 0.004447 | 0.011230 | −0.001563 | −0.003948 | −0.009971 | 0.230233 | 0.556293 |
| 4 | −0.036546 | 0.004652 | −7.144144 | 0.909352 | −0.115748 | −0.855949 | 0.123684 |
| 5 | 0.020439 | 0.007735 | 1.132722 | 0.428694 | 0.162245 | 0.223232 | 0.145889 |
| 6 | −0.009674 | −0.011518 | −0.133782 | −0.159270 | −0.189615 | −0.066661 | −0.305102 |
| 7 | 0.005840 | 0.006871 | 0.142808 | 0.168018 | 0.197679 | 0.068633 | 0.313325 |
| 8 | −0.036268 | −0.000515 | −27.298813 | 0.387600 | −0.005503 | −0.755702 | −0.010808 |
| 9 | 0.083855 | 0.008527 | 19.151545 | 1.947380 | 0.198015 | 0.478732 | 0.068813 |
| 10 | 0.001404 | −0.020592 | −0.000409 | 0.005993 | −0.087908 | 0.109688 | −0.319490 |
| 11 | 0.009715 | 0.009825 | 0.209408 | 0.211773 | 0.214164 | 0.101513 | 0.319241 |
| 12 | 0.045740 | −0.005584 | 20.136537 | −2.458453 | −0.300150 | 0.535975 | −0.102082 |
| 13 | −0.098393 | 0.012314 | −16.560388 | 2.072584 | −0.259390 | −0.535185 | 0.099444 |
| 14 | −0.056185 | −0.030144 | −3.221657 | −1.728495 | −0.927378 | −0.279177 | −0.647345 |
| 15 | 0.004757 | 0.009834 | 0.077787 | 0.160799 | 0.332400 | −0.128003 | 0.422525 |
| 16 | 0.036401 | −0.002950 | 8.254187 | −0.668891 | 0.054205 | 0.591896 | −0.052358 |
| 17 | −0.010411 | 0.007355 | −0.294687 | 0.208188 | −0.147080 | −0.091745 | 0.168723 |
| 18 | 0.030417 | −0.003218 | 6.855397 | −0.725271 | 0.076730 | 0.323396 | −0.042332 |
| Total | 0.000503 | 0.000737 | 1.342025 | 0.009462 | −0.012381 | 0.102417 | 0.216858 | wherein
L: Lateral chromatic aberration;
T: Longitudinal chromatic aberration;
SA: Spherical aberration;
CM: Coma;
AS: Astigmatism;
PT: Petzval sum;
DS: Distortion

EXAMPLE 2

Focal length F = 100    Back Focal Distance bf = 147.6

| R1 | 233.696 | D1 | 13.45 | N1 | 1.65844 | $\nu$1 | 50.9 |
| R2 | 962.989 | D2 | 0.61 | | | | |
| R3 | 164.218 | D3 | 5.31 | N2 | 1.68893 | $\nu$2 | 31.1 |
| R4 | 50.067 | D4 | 15.95 | | | | |
| R5 | 140.4 | D5 | 10.61 | N3 | 1.68893 | $\nu$3 | 31.1 |
| R6 | −897.416 | D6 | variable | | | | |
| R7 | −452.406 | D7 | 3.27 | N4 | 1.65844 | $\nu$4 | 50.9 |
| R8 | 48.627 | D8 | 9.87 | | | | |
| R9 | 83.678 | D9 | 53.37 | N5 | 1.69895 | $\nu$5 | 30.1 |
| R10 | −313.835 | D10 | 8.16 | | | | |
| R11 | 417.888 | D11 | 18.85 | N6 | 1.7725 | $\nu$6 | 49.6 |
| R12 | −84.507 | D12 | 7.73 | | | | |
| R13 | −80.807 | D13 | 3.67 | N7 | 1.80518 | $\nu$7 | 25.4 |
| R14 | 175.545 | D14 | 3.67 | | | | |
| R15 | −250.479 | D15 | 9.7 | N8 | 1.6935 | $\nu$8 | 53.2 |
| R16 | −67.241 | D16 | 0.61 | | | | |
| R17 | −480.878 | D17 | 8.27 | N9 | 1.6935 | $\nu$9 | 53.2 |
| R18 | −128.052 | | | | | | |

The values of the factors in the inequalities:-
$F_I = -0.584F$
$F_{II} = -2.951F$
$(D9 + D11)/L = 0.385$
$1/R12 - 1/R13 = 0.0542/F$
$F_{III} = -11.702F$
$H7 = 1.081$ Lens Separation during Focusing

| | D6 |
|---|---|
| Infinity | 4.49 |
| Magnification 1/10 | 2.2 |

EXAMPLE 3

Focal Length F = 100    Back Focal Distance bf = 147.6

| R1 | 168.775 | D1 | 16.33 | N1 | 1.55963 | $\nu$1 | 61.2 |
| R2 | 741.14 | D2 | 0.61 | | | | |
| R3 | 172.106 | D3 | 5.31 | N2 | 1.59551 | $\nu$2 | 39.2 |
| R4 | 43.912 | D4 | 17.6 | | | | |
| R5 | 173.906 | D5 | 8.16 | N3 | 1.60342 | $\nu$3 | 38 |
| R6 | 433.407 | D6 | variable | | | | |
| R7 | 489.846 | D7 | 3.27 | N4 | 1.55963 | $\nu$4 | 61.2 |
| R8 | 49.096 | D8 | 10.8 | | | | |
| R9 | 85.318 | D9 | 43.34 | N5 | 1.71736 | $\nu$5 | 29.5 |
| R10 | −356.414 | D10 | 8.16 | | | | |
| R11 | 476.96 | D11 | 19. | N6 | 1.713 | $\nu$6 | 53.9 |
| R12 | −78.214 | D12 | 4.29 | | | | |
| R13 | −84.221 | D13 | 4.9 | N7 | 1.80518 | $\nu$7 | 25.4 |
| R14 | 157.638 | D14 | 4.01 | | | | |
| R15 | −265.306 | D15 | 10.28 | N8 | 1.6968 | $\nu$8 | 55.5 |
| R16 | −68.231 | D16 | 0.61 | | | | |
| R17 | −560.154 | D17 | 9.15 | N9 | 1.6968 | $\nu$9 | 55.5 |
| R18 | −130.765 | | | | | | |

The values of the factors in the inequalities:-
$F_I = -0.620F$
$F_{II} = -4.115F$
$(D9 + D11)/L = 0.343$
$1/R12 - 1/R13 = -0.0912/F$
$F_{III} = -2.132F$
$H7 = 1.108$ Lens Separation during Focusing

| | D6 |
|---|---|
| Infinity | 5.71 |
| Magnification 1/10 | 2.1 |

What is claimed is:

1. A retrofocus type wide angle objective lens comprising, from front to rear, a first positive meniscus lens of forward convexity, a second negative meniscus lens of rearward concavity, a third positive lens, a fourth negative lens, the rear surface of said third positive lens and the front surface of said fourth negative lens having curvatures of the same sign, a fifth bi-convex lens with its front surface having a stronger curvature, a diaphragm, a sixth biconvex lens with its rear surface having a stronger curvature, a seventh biconcave lens with its front surface having a stronger curvature, and eighth and ninth positive meniscus lenses of foward concavity, said objective satisfying the following conditions:

$$0.5F \leq |F_I| \leq 0.75F, \, F_I < 0 \qquad (1)$$

$$2.5F \leq |F_{II}| \leq 4.5F, \, F_{II} < 0 \qquad (2)$$

$$0.29 \leq (D9 + D11)/L \leq 0.42 \qquad (3)$$

$$|1/R12 - 1/R13| \leq 0.13/F \qquad (4)$$

$$0.02F \leq D12 \leq 0.1F \qquad (5)$$

wherein F is the focal length of the entire system; $F_I$ is the composite focal length of the first to fourth lenses; $F_{II}$ is the composite focal length of the first to fifth lenses; L is the length of the lens system from the front surface of the first lens to the rear surface of the ninth lens; D9 is the axial thickness of the fifth lens; D11 is the axial thickness of the sixth lens; R12 is the radius of curvature of the rear surface of the sixth lens; R13 is the radius of curvature of the front surface of the seventh lens; and D12 is the axial air separation between the sixth and seventh lenses.

2. A retrofocus type wide angle objective lens according to claim 1, satisfying the following conditions:

$$48 \leq \nu1 \leq 63; \, 48 \leq \nu4 \leq 63; \, 48 \leq \nu6 \leq 63 \qquad (6)$$

$$30 \leq \nu2 \leq 41; \, 30 \leq \nu3 \leq 41; \, 26 \leq \nu5 \leq 32 \qquad (7)$$

wherein $\nu1$, $\nu2$, $\nu3$, $\nu4$, $\nu5$ and $\nu6$ are the Abbe numbers of the first, second, third, fourth, fifth and sixth lenses respectively.

3. A retrofocus type wide angle objective lens according to claim 1, wherein as focusing is effected down from infinity to shorter object distances, the lens system is moved forward as a whole, while the axial air separation between said third and said fourth lenses is simultaneously decreased, and satisfying the following conditions:

$$F_{III} < 0, \, 1.9F \leq |F_{III}| \leq 12F \qquad (8)$$

$$1 \leq H7 \leq 1.2 \qquad (9)$$

wherein $F_{III}$ is the composite focal length of the first to third lenses; and H7 is the height of incidence on the front surface of said fourth lens of a paraxial ray which entered the system at an incident angle of zero and at an incident height of 1 with object at infinity for the focal length of the entire system normalized to 1.

* * * * *